(12) United States Patent
Negel et al.

(10) Patent No.: US 10,508,788 B2
(45) Date of Patent: Dec. 17, 2019

(54) MULTIFUNCTION LAMP UNIT AND REAR VIEW DEVICE THEREWITH

(71) Applicant: SMR Patents S.à.r.l., Luxembourg (LU)

(72) Inventors: Raimund Negel, Unterensingen (DE); Arne Schmierer, Kirchheim/Teck (DE); Daniel Fritz, Stuttgart (DE); Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 222 days.

(21) Appl. No.: 15/589,043

(22) Filed: May 8, 2017

(65) Prior Publication Data

US 2017/0240102 A1    Aug. 24, 2017

Related U.S. Application Data

(63) Continuation-in-part of application No. 15/439,188, filed on Feb. 22, 2017, and a continuation-in-part of (Continued)

(30) Foreign Application Priority Data

Jan. 24, 2012    (AU) ................................ 2012900267
Feb. 24, 2015    (EP) ..................................... 15156407

(51) Int. Cl.
*B60Q 1/00*    (2006.01)
*B60R 1/06*    (2006.01)
(Continued)

(52) U.S. Cl.
CPC .............. *F21S 45/50* (2018.01); *B29C 45/16* (2013.01); *B29D 11/00663* (2013.01); *B29D 11/00682* (2013.01); *B60Q 1/2665* (2013.01); *B60Q 1/38* (2013.01); *F21S 43/14* (2018.01); *F21S 43/19* (2018.01); *F21S 43/195* (2018.01); *F21S 43/237* (2018.01); *F21S 43/239* (2018.01);
(Continued)

(58) Field of Classification Search
CPC . B60Q 1/34; B60R 1/08; B60R 1/1207; F21S 43/239; F21S 43/14
See application file for complete search history.

(56) References Cited

U.S. PATENT DOCUMENTS 6,896,397 B2 *   5/2005   Yamada ............... B60Q 1/0058
                                                       362/511
8,820,990 B2     9/2014   Wegner et al.
(Continued)

FOREIGN PATENT DOCUMENTS

DE    102008044357 A1    6/2009
DE    102011106595 A1   12/2012
(Continued)

*Primary Examiner* — Karabi Guharay
(74) *Attorney, Agent, or Firm* — Jones Day (57) ABSTRACT

A multifunction lamp unit for a vehicle includes a housing, at least one light conductor with at least one illuminant provided by an LED on a printed circuit board, at least one light foil, and a clear lens. A method for manufacturing lamps for vehicles includes producing a housing, a light conductor, and a clear lens as one unit out of plastic in a 3-component injection procedure.

42 Claims, 6 Drawing Sheets

Related U.S. Application Data application No. 15/052,120, filed on Feb. 24, 2016, now Pat. No. 9,643,532, said application No. 15/439,188 is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616.

(51) Int. Cl.
| | |
|---|---|
| *F21S 45/50* | (2018.01) |
| *F21S 43/239* | (2018.01) |
| *F21S 43/14* | (2018.01) |
| *F21S 43/19* | (2018.01) |
| *B29C 45/16* | (2006.01) |
| *B29D 11/00* | (2006.01) |
| *B60Q 1/26* | (2006.01) |
| *F21S 43/237* | (2018.01) |
| *B60Q 1/38* | (2006.01) |
| *F21S 43/245* | (2018.01) |
| *F21S 43/247* | (2018.01) |
| *F21S 45/60* | (2018.01) |
| *B29L 11/00* | (2006.01) |
| *B29L 31/00* | (2006.01) |
| *F21V 8/00* | (2006.01) |
| *F21W 103/25* | (2018.01) |

(52) U.S. Cl.
CPC ........... *F21S 43/245* (2018.01); *F21S 43/247* (2018.01); *B29K 2995/0031* (2013.01); *B29L 2011/0016* (2013.01); *B29L 2031/747* (2013.01); *B60Q 2400/40* (2013.01); *F21S 45/60* (2018.01); *F21W 2103/25* (2018.01); *G02B 6/0038* (2013.01); *G02B 6/0065* (2013.01)

(56) References Cited

U.S. PATENT DOCUMENTS

| | | | |
|---|---|---|---|
| 2008/0212189 A1* | 9/2008 | Baur | B32B 17/10174 359/604 |
| 2011/0074958 A1* | 3/2011 | Pastrick | B60Q 1/2665 348/148 |

FOREIGN PATENT DOCUMENTS

| | | |
|---|---|---|
| EP | 2407346 A1 | 1/2012 |
| EP | 2525138 A1 | 11/2012 |

* cited by examiner

MULTIFUNCTION LAMP UNIT AND REAR VIEW DEVICE THEREWITH

CROSS-REFERENCE TO RELATED APPLICATIONS

This application is a continuation-in-part of U.S. patent application Ser. No. 15/052,120, filed Feb. 24, 2016, which claims the benefit of foreign priority to European Patent Application No. 15156407.7, filed Feb. 24, 2015; and this application is a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, each of which is herein incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to a method for manufacturing a lamp for vehicles and side-view viewing means, such as mirrors or camera pods, preferably in the form of a blinker.

2. Description of Related Art

A lamp for vehicles, especially for side-view mirrors or other viewing means, is described in European Patent No. 1 657 488 B 1. In this lamp, a weld seam or an adhesive seam inseparably connects a substantially U-shaped front housing part, which is configured as a transparent clear lens, to a back panel in order to provide a closed, watertight housing within which at least one illuminant is arranged. The housing components are described as made of hard plastics, preferably polymethyl methacrylate (PMMA) or plastics of this family. The back panel can also be made of another plastic, such as polycarbonate (PC), polybutylene terephthalate (PBT) or the like.

Another such lamp for vehicles is described in European Patent No. 1 852 306 B1, in which an illuminant, the outside, or the inside of a U-shaped front housing part features a lens system. The lens system is in the form of a surface texturing for the focusing, parallel direction, or scattering of the emitted light.

The construction of these known lamps is expensive. In addition, welding processes negatively affect the tolerances of adjacent clearances. The necessity of a weld seam or adhesive seam also limits the design of the lamps, as with a blinker in a side-view mirror arrangement of a vehicle.

German Patent Application No. 10 2011 103 200 A1 describes a light window for an illuminated unit in a side-view mirror where the light window fits the outer contour of the housing of the side-view mirror and seals an opening in the housing of the side-view mirror. The light window serves as a light conductor and features outcoupling structures on at least one area. The light window is produced out of an optical film which has a molded coating and is configured as a light conductor, where the optical film contains at least one outcoupling structure. A crystal-clear base material or, alternatively, a colored transparent material can be used for production and it can be produced in a single extrusion die. To produce the light window, the optical film is placed into the extrusion die so that a protective layer is injected on the die side of the film and the coating is injected on the core side of the film. The protective layer can be made of PC film and the coating can be made of PC or PMMA.

Molding a coating on a film to produce a light window, such as a blinker, is complicated particularly since a fastening on a housing is also needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a method for manufacturing a lamp for vehicles overcomes the disadvantages of the state of the art. For example, a lamp should be easy to manufacture and offer large freedom of design with high light yield.

In an aspect, a multifunction lamp unit for a vehicle includes a housing, at least one light conductor together with at least one illuminant provided by at least one LED on a printed circuit board, at least one light foil, and a clear lens.

The unit may be produced out of plastic in a 3-component injection procedure, wherein the refractive index of the plastic of the clear lens is selected to be different from the refractive index of the plastic of the light conductor, the boundary between the clear lens and the at least one light conductor adjacent to it is at least partly formed with a structure.

The light foil is arranged at least partly between the clear lens and at least a part of the at least one light conductor.

At least one light conditioning area, such as for tinting, dying, reflecting, scattering or the like, is introduced into at least one of the at least one light conductor and the clear lens by choosing at least one additive for the respective plastic.

The housing may be formed with a first recess to build an installation space for at least one illuminant, wherein the first recess is sealed.

The housing may be formed with a second recess to build an installation space for a control unit, wherein the second recess is sealed.

The control unit may be connected to at least one of the at least one illuminant, the light foil and the vehicle.

The light foil may extend along at least a part of the clear lens.

The at least one light coupling area may be provided at a first end of a first light conductor facing the installation space or a first end of a second light conductor extending along a region of the light foil.

Each light conductor may be enclosed by the housing and the clear lens.

The light rays from a first illuminant may be subjected to a total reflection at the boundary between the first light conductor and the clear lens outside at least one light decoupling area.

The light rays from a second illuminant may be decoupled along at least a part of the extent of the second light conductor.

The light rays decoupled from the second light conductor may pass at least one of the light foil, the clear lens, and the housing.

The light rays decoupled from the second light conductor may pass an opening in at least one of the light foil and the housing.

The light rays from a third illuminant are coupled at a first end of a third light conductor and decoupled at the second end of the third light conductor.

There may be a plurality of light decoupling regions provided by at least one of the clear lens and the housing.

There may be a plurality of at least one of light decoupling directions and light decoupling ranges.

There may be a plurality of light decoupling regions, with light having different characteristics being decoupled from the different decoupling regions.

The clear lens may be made out of a polymeric substrate, where the polymeric substrate is coated with a chromium-based reflective coating, and the polymeric substrate and the chromium-based reflective coating are at least in part permeable to light originating from at least one of the light foil and the at least one illuminant.

The coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase.

The polymeric substrate may include a polymeric light pipe into which light from a fourth illuminant is coupled.

The alloy may be a binary alloy of chromium and the dopant material.

The atomic percentage of the dopant material in the binary alloy may range from about 1.9 at. % to about 5.8 at. %.

The dopant material may be selected from hexagonally close-packed transition metals zirconium, titanium, cobalt, hafnium, rubidium, yttrium and osmium.

The dopant material may be selected from hexagonally close-packed transition metals zirconium, titanium and cobalt.

The alloy may be a binary alloy and the dopant material is zirconium where the atomic percentage of the zirconium in the binary alloy is in the range of from about 4.5 at. % to about 5.8 at. %.

The alloy may be a binary alloy and the dopant material may be titanium, and where the atomic percentage of the titanium in the binary alloy is in the range of from about 1.9 at. % to about 5.8 at. %.

The alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm.

The polymeric substrate may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal and blends of these.

The polymeric substrate may be formed from a material selected from the group of polycarbonate, poly(2,2'-dihydroxyphenylpropane) carbonate, polydiethyleneglycol bis (allyl carbonate), polymethylmethacrylate and polystyrene, or blends thereof.

The polymeric substrate may include a pre-coated film in the form of either a hardcoat, an inorganic oxide, or a thin metal film, or a combination of such pre-coated films.

A rear view device of a vehicle may include the multifunction lamp unit.

The illuminant and the light foil may fulfill different light functions.

At least two illuminants may fulfill different light functions.

The rear view device may further include a head moveable relative to the vehicle, with the head including at least one casing part providing at least one opening for the multifunction lamp unit.

The clear lens may extend along the casing part.

The clear lens may be connected at least to the casing part.

The casing part may be provided by a bezel.

The rear view device may include at least one of a camera and a reflective element.

The camera may be arranged within the head.

The rear view device may further include at least one light decoupling region providing at least one of a turn light indicator, a blind spot indicator, a puddle light, a logo light and an approach light.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any biological and non-biological life form, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figures 1, 2, 3:
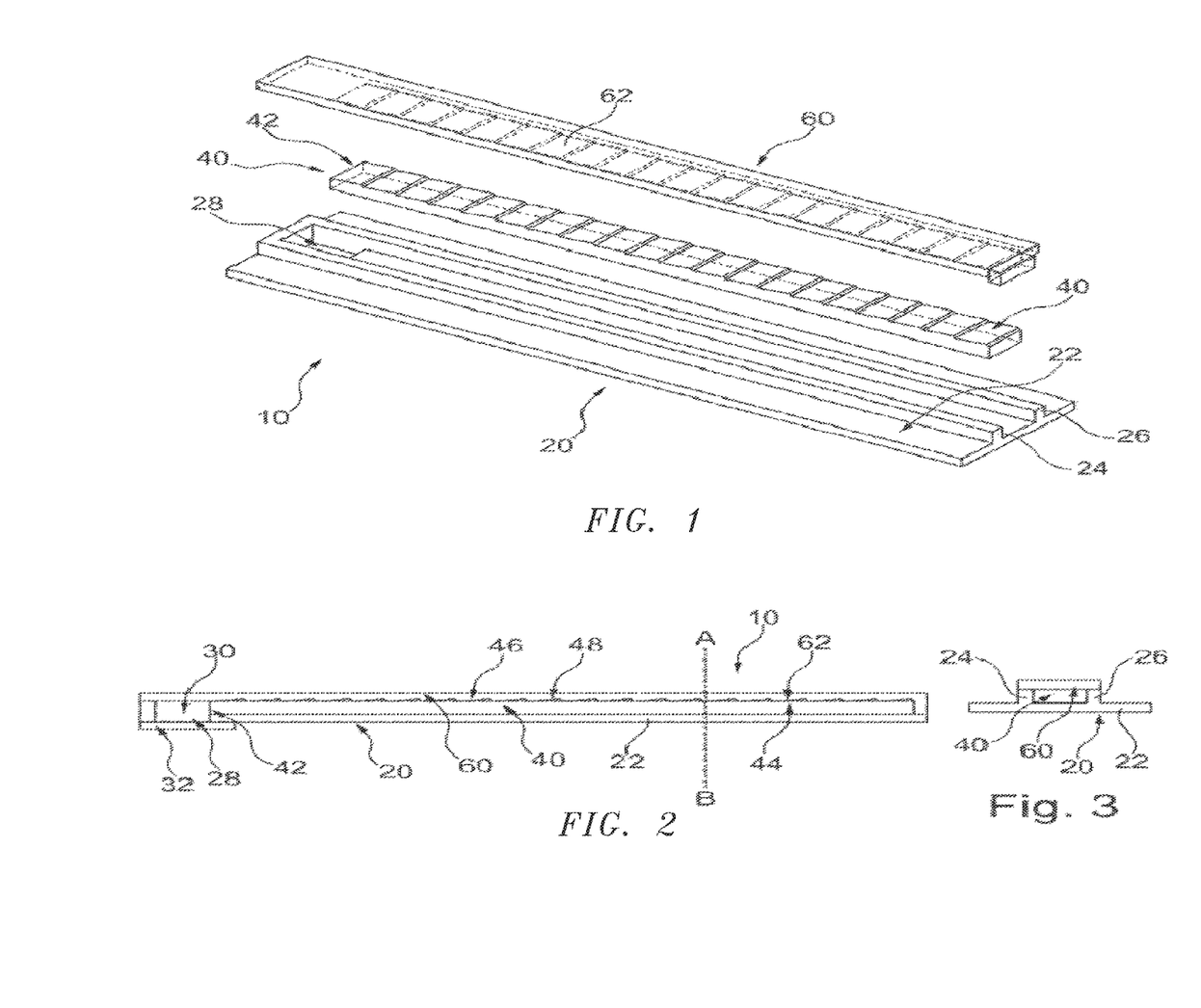
FIG. 1 is a diagram illustrating a housing, a light conductor and a clear lens of a lamp produced according to an embodiment.
FIG. 2 is a diagram illustrating the light from FIG. 1 as a unit in longitudinal section.
FIG. 3 is a diagram illustrating a cross-sectional view along the line A-B in FIG. 2.

As illustrated in FIG. 1, a lamp 10 includes a housing 20, a light conductor 40 and a clear lens 60. Although not illustrated, a light foil may be arranged within the lamp 10 in accordance with the description of this application. Details related to the light foil are provided at least in reference to FIGS. 6-13 and their accompanying description. These three components are manufactured in an injection molding process. For example, the light conductor 40 can be produced out of PC in a first phase, the clear lens 40 out of crystal-clear or tinted PMMA in a second phase, and the housing 20 out of ABS (acrylonitrile-butadiene-styrene) in a third phase. As a result, one unit is formed, for example, as illustrated in FIGS. 2 and 3 in longitudinal section and cross-section, respectively.

Still referring to FIGS. 1-3, the housing 20 is formed with a back panel 22 and two webs 24 and 26 to receive the light conductor 40 between the webs 24 and 26 on the back panel 22. In addition, a recess 28 which builds an installation space 30 for an illuminant, which is not illustrated, is provided in the housing 20. The illuminant can include an LED on a printed circuit board, and the installation space 30 together with all plug boxes can be sealed by a lid 32.

The light conductor 40 features one end having at least one light incoupling area 42 adjacent to the installation space 30. Its surface, which borders the lower surface of the clear lens 60, can be provided with a lens system 44 which provides the total reflection areas 46 and outcoupling area 48 for the light that enters the light conductor 40 at each incoupling area 42. Because the clear lens 60 is formed with a corresponding lens system 62 on its surface opposite the lens system 44 of the light conductor 40, and also because the refractive indexes of the plastics of the clear lens 60 and of the light conductor 40 differ, total reflection at the outcoupling areas 48 is excluded.

Figure 4:
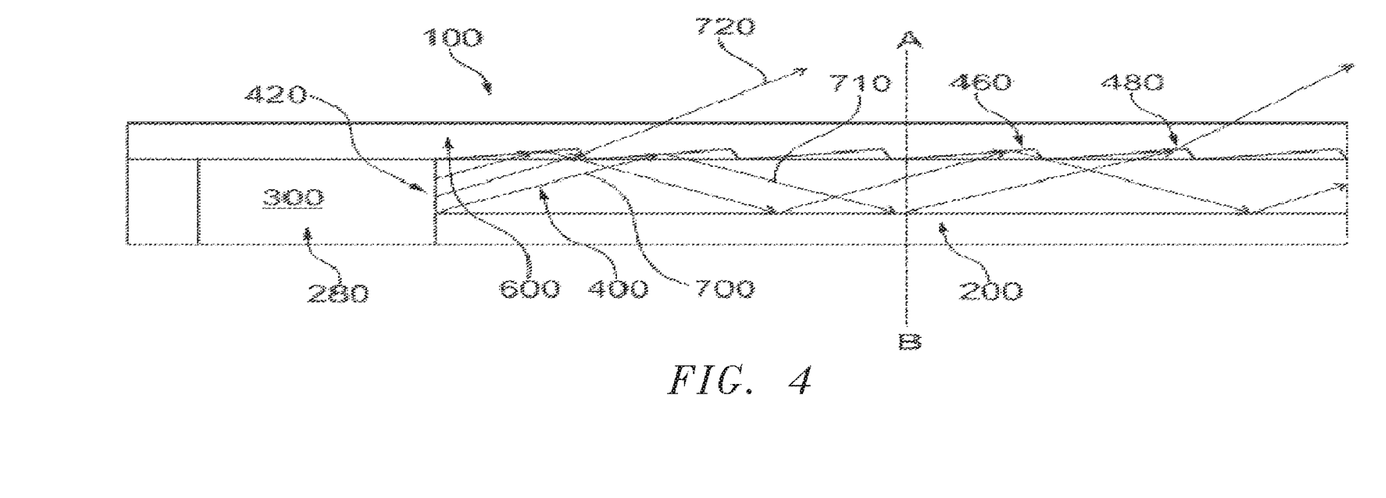
FIG. 4 is a diagram illustrating a part of an alternative lamp in longitudinal section.

The optical path within a lamp produced according an example of the invention will be explained in more detail below in reference to FIGS. 4 and 5. The illustrated lamp 100 differs from the lamp 10 due to a different geometry for the light, whereas the light conductor 40 of the lamp 10 has a rectangular shaped cross section.

Figure 5:
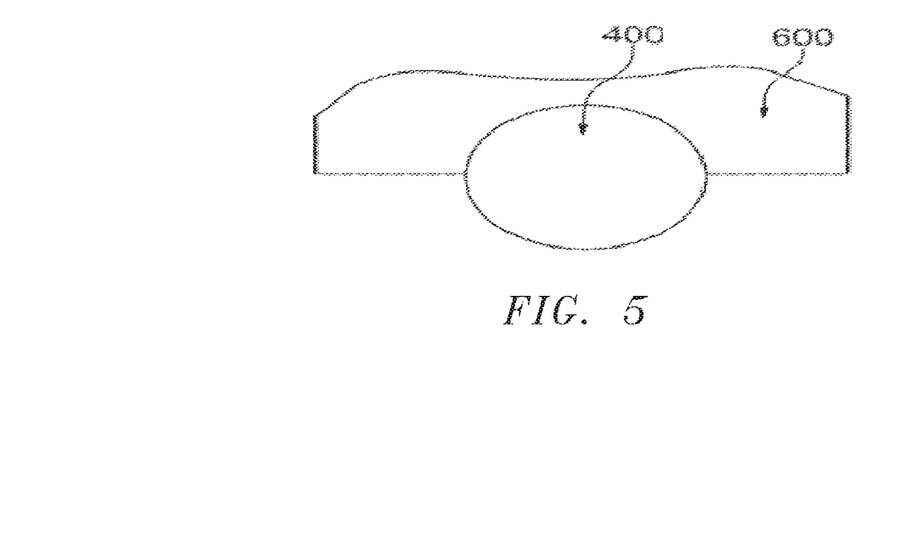
FIG. 5 is a diagram illustrating a cross-sectional view along the line A-B in FIG. 4.

To be enclosed between the back panel 22, the webs 24 and 26 of the housing 20, and the clear lens 60, the light conductor 400 of the lamp 100 has a circular cross section, as illustrated in FIG. 5. In addition, the shape of the housing 200 and the clear lens 600 of the lamp 100 of FIGS. 4 and 5 is also adapted to have this circular shape.

The housing 200 is again configured into an installation space 300 for an illuminant by means of a recess 230.

The light conductor 400 in turn features incoupling areas 420 for light rays from the illuminant, these light rays propagating in the form of the light rays 700 in the light conductor 400 in order to be deflected into the total reflecting light rays 710 at the total reflection areas 420 and into the light rays 720 leaving the lamp 100 at the outcoupling areas 480.

The shape of the clear lens 600 is adapted not only to the shape of the light conductor 400, but can also satisfy any design requirements on the lamp 100. For example, the surface can feature a wave form as illustrated in FIG. 5.

Figure 6:
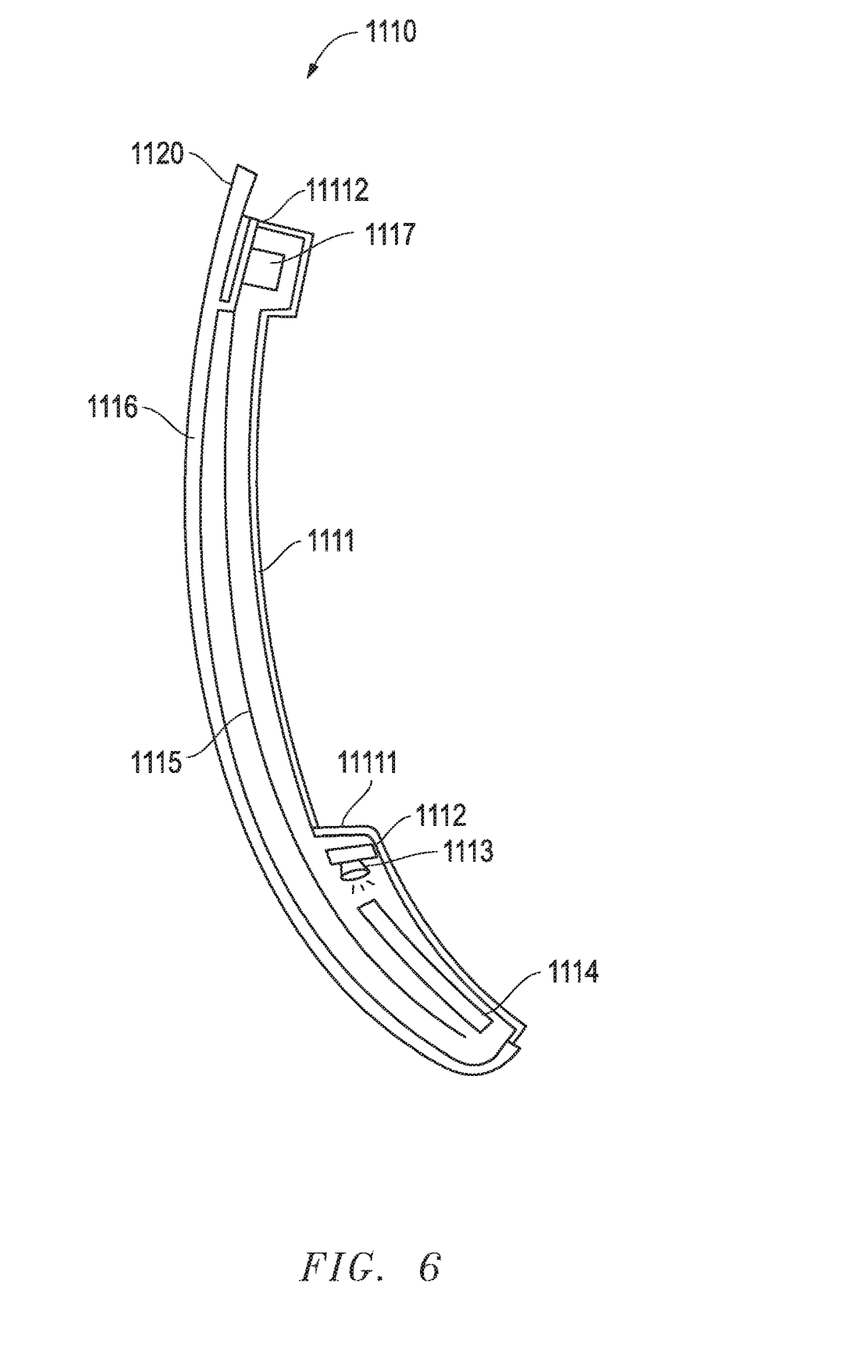
FIG. 6 is a diagram illustrating a cross section of another embodiment of a multifunction lamp unit making use of a light foil.

Referring now to FIG. 6, a cross section of another embodiment of a multifunction lamp unit 1110 making use of a light foil 1115 is illustrated. The lamp unit 1110 is provided as a single module which can be easily installed in a rear view device of a vehicle. Such a rear view device can include at least one reflective element and/or camera. The outer surface of the module is adapted to the contour of the rear view device into which it is to be installed. Further details on such an adaption are, in particular, described in U.S. Pat. No. 8,950,914 B2 which is incorporated herein by reference in its entirety.

The lamp unit 1110 comprises a housing 1111 with a first recess 11111 for housing a first illuminant or light source with a printed circuit board 1112 carrying an LED 1113. Light emitted from the first light source 1112, 1113 is coupled into a first light conductor 1114, with the respective light being decoupled from the first light conductor 1114 at one end of the lamp unit 1110.

The lamp unit 1110 further comprises a second light source in the form of a light foil 1115. Such light foils are known in the form of, for example, light tapes of the company Light Tape Limited or in the form of a printed lighting as distributed by the company Center of Process Innovation Limited. Making usage of such a light foil 1115 reduces the overall weight of the lamp unit 1110 and enables the production of smaller modules. Still further, the use of light foils 1115 allows in-process integration as it can be inserted into a mould and over-mould.

The light foil 1115 extends along a light window 1116 which is provided as a lid for the housing 1111. The connection between the light window 1116 and the housing 1111 is suited to provide a sealed module which is beneficial when used in an external rear view device.

Still further, the light foil 1115 is connected with a control unit 1117 arranged within a second recess 11112 of the housing 1111. Said control unit 1117 can also be connected to the printed circuit board 1112 and a control device within the vehicle to which the rear view device with the lamp unit 1110 is attached.

As depicted in FIG. 6, the light foil 1115 extends from one end of the lamp unit 1110 to the other end thereof and, thus, overlaps the first light source 1112, 1113 and the first light conductor 1114. The light foil 1115 runs parallel to the interior surface of the light window 1116.

The light window 1116 is acting as a clear lens and is connected to a casing part 1120 of the rear view device as described in U.S. Pat. No. 8,950,914 B2.

From the outside of the lamp unit 1110 of FIG. 6, a viewer can only see the light foil 1115 through the light window 1116, whereas the first light source 1112, 1113 and the first light conductor 1114 are hidden. In order to also hide the light foil 1115 when it is not lit, the light window 1116 can be coated with a chromium-based reflective coating which is translucent. In fact, it is preferred to produce the light window 1116 from a polymeric substrate coated with a chromium-based reflective coating as described in U.S. patent application Ser. No. 14/936,024, which is incorporated herein by reference in its entirety.

Figure 8:
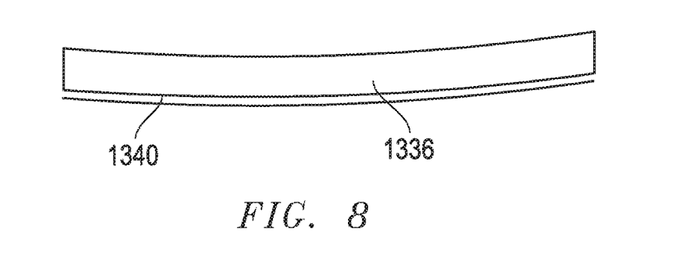
FIG. 8 is a diagram illustrating a cross section of a clear lens with a chromium-based coating.

FIG. 8 depicts a polymeric substrate in the form of a clear lens 1336 or light window provided with a coating 1340. The coating 1340 is at least in part permeable to light originating, for example, from a light foil placed behind the clear lens 1336.

Thus, it is possible to hide both light sources shown in FIG. 6, i.e. the printed circuit board 1112, the LED 1113 and the light foil 1115, and to hide the light conductor 1114 by making usage of the lens 1336 together with the coating 1340 instead of the light window 1116. The light unit 1110 can be integrated into a casing with a metallic coating such that the whole surface will have an appealing metallic look. As soon as the light foil 1114 is lit, respective light rays will pass not only through the lens 1336 but also through the chromium-based coating 1340 thereon. But the first light source 1112, 1113 and the first light conductor 1114 will remain hidden.

Figure 9:
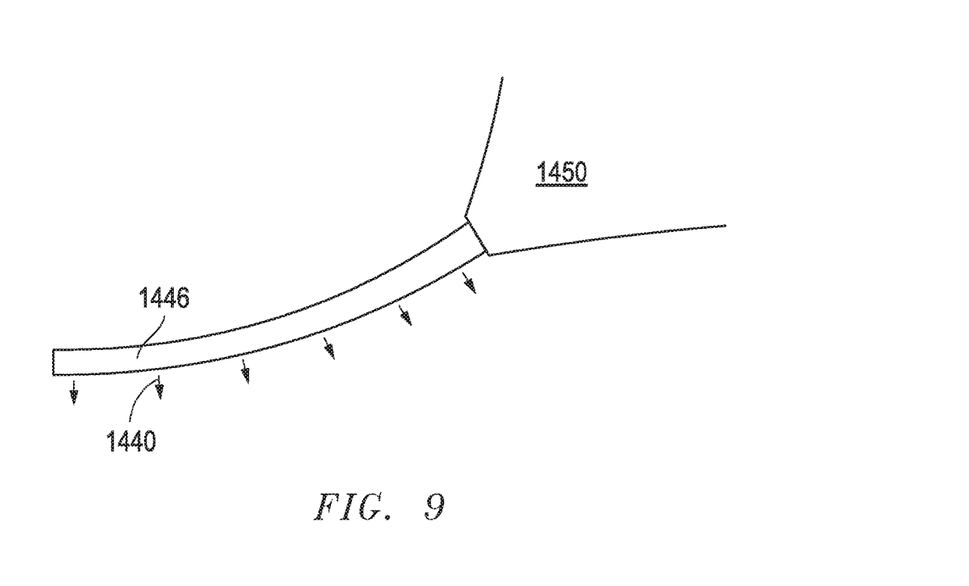
FIGS. 9, 10, 11, 12, and 13 are diagrams illustrating cross sections of the multifunction lamp units together with the decoupled light rays and/or light cones being shown.

FIG. 9 illustrates light rays 1440 emitted from a light foil within a lamp unit 1446 as well as a light cone 1450 decoupled from a light conductor into which light from an LED is coupled in line with the embodiment of FIG. 6. Different functions can be fulfilled by said light rays 1440 and said light cone 1450.

For example, the lamp unit 1416 can be a turn signal indicator module of a rear view device of a vehicle, in particular an exterior mirror, such that the light cone 1450 has to fulfill the ECE (Economic Commission for Europe) regulations ensuring that a region beginning from 5° from the longitudinal axis of the vehicle, up to 60° to the longitudinal axis of the vehicle in the opposite direction of movement is lit up. The light rays 1440 could provide a decorative effect or additional warning effect.

Figure 7:
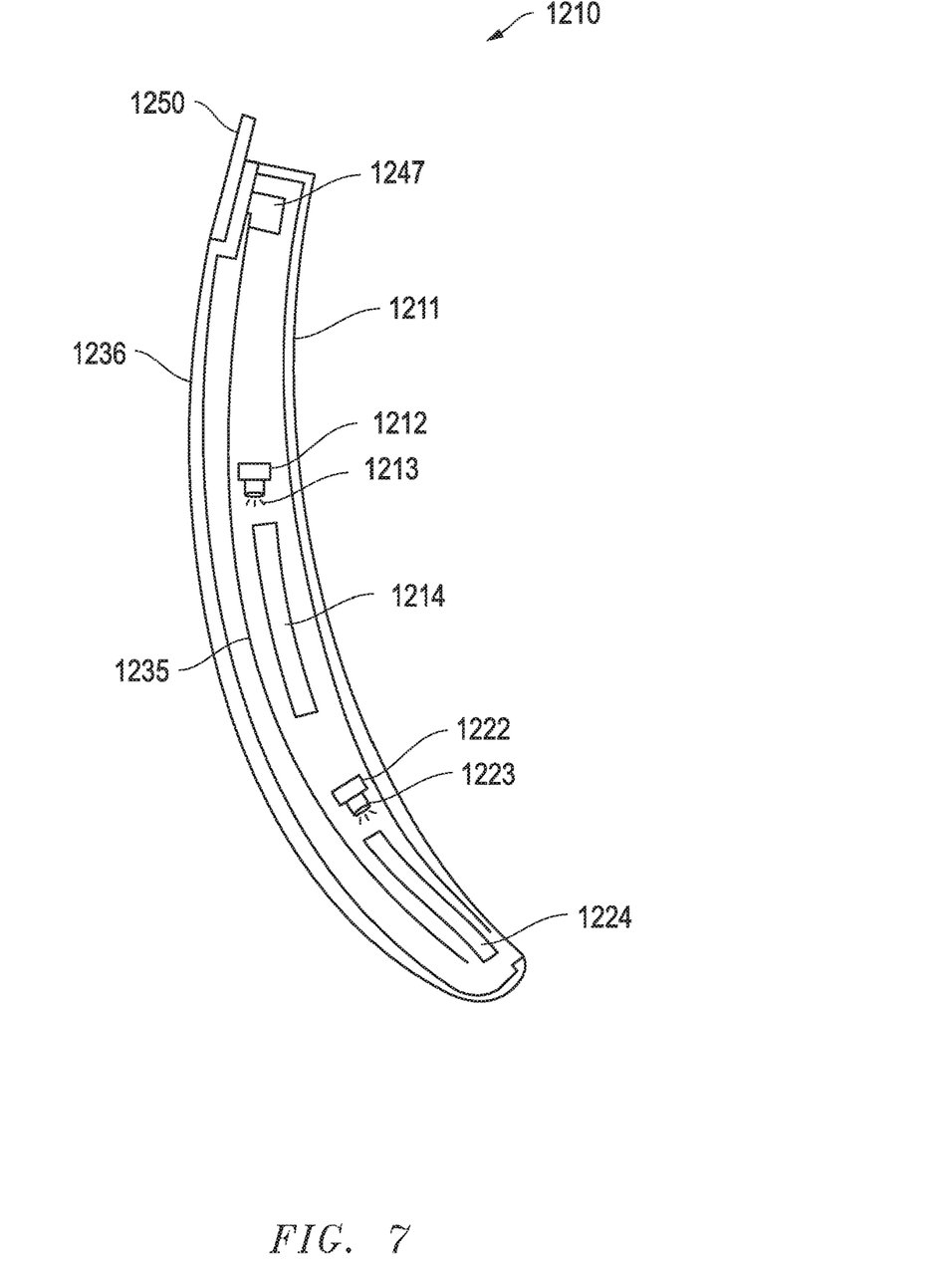
FIG. 7 is a diagram illustrating a cross section of yet another embodiment of a multifunction lamp unit making use of a light foil.

FIG. 7 shows an alternative embodiment of a multifunctional lamp unit 1210 of the invention which, in contrast to the lamp unit 1110 of FIG. 6, has three light sources. The lamp unit 1210 makes usage not only of a first printed circuit board 1222 and a first LED 1223 for coupling light into a first conductor 1224 and a light foil 1235, but in addition uses a second printed circuit board 1212 and a second LED 1213 for coupling light into a second conductor 1214. The light foil 1235 extends along a lens 1336 and overlaps both of the other two light sources 1212, 1213 and 1222, 1223 as well as their respective light conductors 1214, 1224. The lens 1336 is coated with the translucent chromium-based coat, but does not have to be coated.

Figure 10:
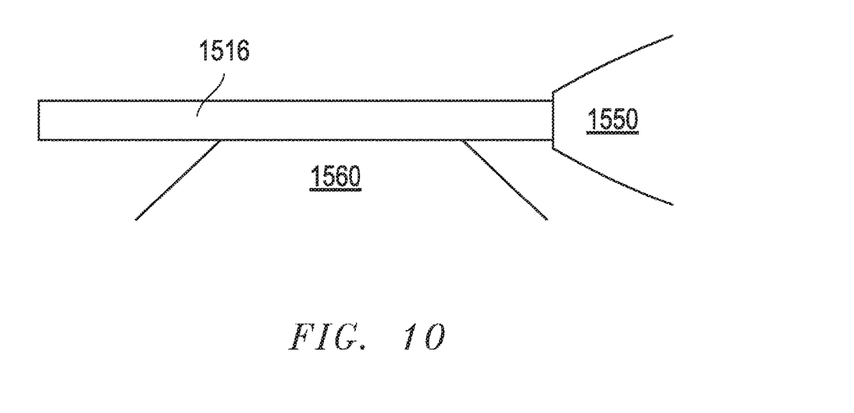
Figure 11:
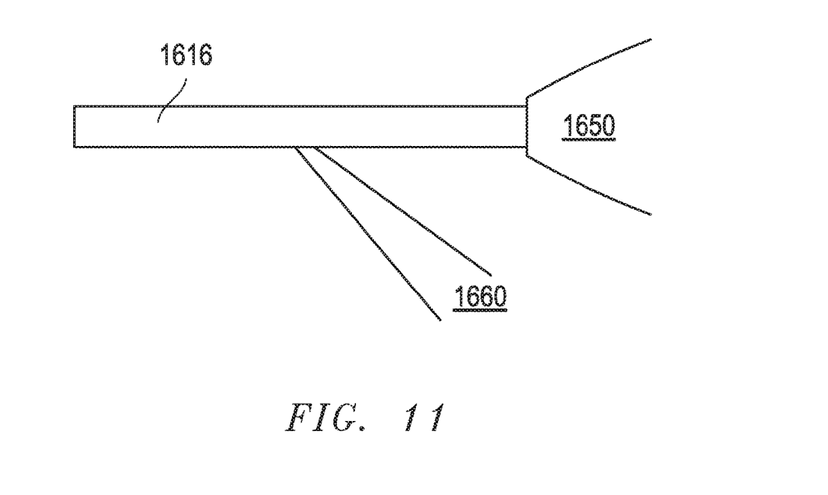

Thus, in addition to the first light source 1222, 1223 and the second light source 1235, the lamp unit 1250 includes the third light source 1212, 1213. FIG. 10 and FIG. 11 illustrate light cones decoupled from the first and third light sources 1222, 1223 and 1212, 1213.

Referring to FIG. 10, a multifunction lamp unit 1516 emits light rays along its lens in analogy to the lamp unit 1416 of FIG. 9. The respective light rays are not shown in FIG. 10. FIG. 10 rather serves to explains light decoupled from two light conductors as the two light conductors 1214 and 1224 of FIG. 7. In fact, the first light conductor 1224 guides all light to one end of the lamp unit 1516 such that there is a light cone 1550, whereas the second light conductor 1214 decouples light along its extension such that there is a light cone 1560 as shown in FIG. 10.

Referring to FIG. 10, each of the light cones 1550 and 1560 as well as the light rays emitted from the light foil can fulfill different functions. For example, the light cone 1550 could be used as a turn signal, whereas the light cone 1560 could be used as an approach light and the light rays emitted from the light foil could have decorative purposes.

Figure 12:
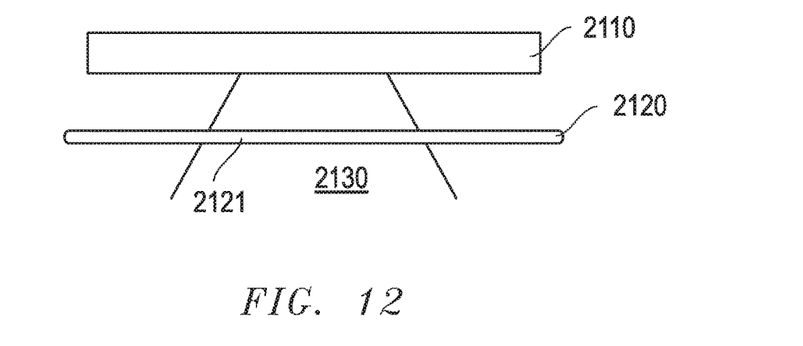
Figure 13:
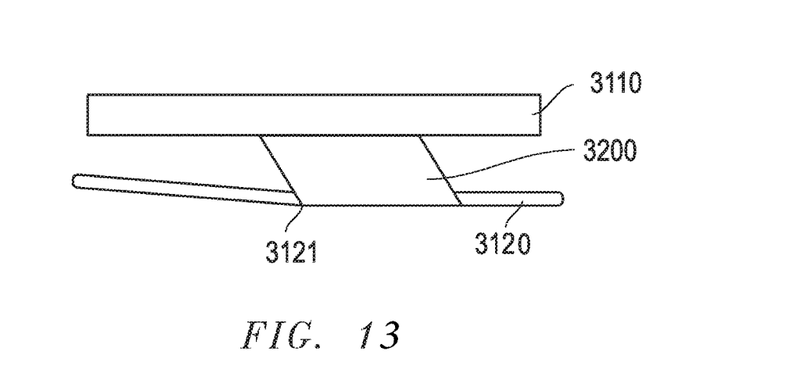

Further possibilities of light emissions from multifunctional lamp units of the invention are shown in FIGS. 11 to 13. Those examples are not restricted to the ones illustrated. There are many more possibilities which lie within the knowledge of a person having ordinary skill in the art.

In the embodiment shown in FIG. 11, which is providing a slight alternative to the one of FIG. 10, a lamp unit 1616 is provided with two light sources each including a printed circuit board and an LED as well as a light guide such that the light cones 1650, 1660 can be decoupled into selected directions. The directions of the light cones 1650, 1660 depend on the functions to be fulfilled. In addition a light foil can be used to emit light ray homogeneously along the lens, although not shown.

FIG. 12 shows a lamp unit 2110 which is installed within a rear view device, e.g. an exterior mirror. A casing part 2120 of the rear view device is shown to overlap one side of the lamp unit 2110, which can be the underside. The casing part 2120 is provided with a transparent region 2121 through which a light cone 2130 can be emitted on the ground in order to provide a puddle light function. The light cone 2130 could come from a specially oriented third light source and/or light conductor.

The embodiment of FIG. 13 shows another lamp unit 3110 arranged within a rear view device, e.g. a camera port, having a casing part 3120 with an opening 3121. A light conductor 3200 is extending from the lamp unit 3110 towards the opening 3121 within the casing part 3120 such that light can be guided into a specific direction to fulfill a specific function which could be the function of a logo lamp.

The rearview device can also be equipped with different illumination devices.

Different functions and devices can be incorporated into and/or controlled with the help of rearview devices including especially also cameras.

Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep.

13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat.

No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

There are many more variations of the amount of light sources, the type of light sources and the relative arrangement of the light sources within a multifunctional lamp unit of the invention. The invention is restricted neither to special rear view devices nor to special arrangements of a lamp unit with such a device.

The features of the invention disclosed in the above description, in the claims and in the figures can be essential for realizing the invention in its various embodiments both individually and in any desired combination.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 10 lamp
20 housing
22 back panel
24 web
26 web
28 recess
30 installation space
32 lid
40 light conductor
42 incoupling area
44 lens system
46 total reflection area
48 outcoupling area
60 clear lens
62 lens system
100 lamp
200 housing
280 recess
300 installation space
400 light conductor
420 incoupling area
460 total reflection area
480 outcoupling area
600 clear lens
1110 lamp unit
1111 housing
1112 printed circuit board
1113 LED
1114 light conductor
1115 light foil
1116 light window
1117 control unit
1120 casing part
1210 lamp unit
1211 housing
1212 printed circuit board
1213 LED
1214 light conductor
1222 printed circuit board
1223 LED
1224 light conductor
1235 light foil
1236 light window
1247 control unit
1250 casing part
1336 lens
1340 coating
1416 lamp unit
1440 light ray
1450 light cone
1516 lamp unit
1550 light cone
1560 light cone
1616 light unit
1650 light cone
1660 light cone
2110 lamp unit
2120 casing part
2121 transparent region
2130 light cone
3110 lamp unit
3120 casing part
3121 opening
3200 light conductor
11111 recess
11112 recess

What is claimed is:

1. A multifunction lamp unit for a vehicle, comprising:
a housing;
at least one light conductor with at least one illuminant provided by an LED on a printed circuit board;
at least one light foil that comprises a light tape or a printed lighting; and
a clear lens.

2. The multifunction lamp unit of claim 1, wherein the multifunction lamp unit, including the clear lens and the at least one light conductor, is produced out of plastic in a 3-component injection procedure, and wherein the refractive index of the plastic of the clear lens is selected to be different from the refractive index of the plastic of the at least one light conductor, and the boundary between the clear lens and the at least one light conductor adjacent to it is at least partly separated by a structure.

3. The multifunction lamp unit of claim 1, wherein the at least one light foil is arranged at least partly between the clear lens and at least a part of the at least one light conductor.

4. The multifunction lamp unit according to claim 1, wherein at least one light conditioning area configured to be used for tinting, dying, reflecting, or scattering is introduced into at least one of the at least one light conductor and the clear lens by choosing at least one additive for respective plastic.

5. The multifunction lamp unit according to claim 1, wherein the housing is formed with a first recess to build an installation space for at least one illuminant, and the first recess is sealed.

6. The multifunction lamp unit according to claim 5, wherein the housing is formed with a second recess to build an installation space for a control unit, and the second recess is sealed.

7. The multifunction lamp unit according to claim 6, wherein the control unit is connected to at least one of the at least one illuminant, the light foil and the vehicle.

8. The multifunction lamp unit according to claim 1, wherein the light foil extends along at least a part of the clear lens.

9. The multifunction lamp unit according to claim 1,
wherein the at least one light conductor comprises a first light conductor and a second light conductor, and
wherein at least one light coupling area is provided at at least one of a first end of the first light conductor facing an installation space and a first end of the second light conductor extending along a region of the at least one light foil.

10. The multifunction lamp unit according to claim 9, wherein each of the first light conductor and the second light conductor is enclosed by the housing and the clear lens.

11. The multifunction lamp unit according to claim 9, further comprising at least one light decoupling area,
wherein the at least one illuminant comprises a first illuminant, and light rays from the first illuminant are subjected to a total reflection at the boundary between the first light conductor and the clear lens outside the at least one light decoupling area.

12. The multifunction lamp unit according to claim 9, wherein the at least one illuminant comprises a first illuminant and a second illuminant, and light rays from the second illuminant are decoupled along at least a part of the extent of the second light conductor.

13. The multifunction lamp unit according to claim 12, wherein the light rays decoupled from the second light conductor pass at least one of the light foil, the clear lens, and the housing.

14. The multifunction lamp unit according to claim 12, wherein the light rays decoupled from the second light conductor pass an opening in at least one of the light foil and the housing.

15. The multifunction lamp unit according to claim 9, wherein the at least one light conductor further comprises a third light conductor and the at least one illuminant comprises a first illuminant, a second illuminant, and a third illuminant, and wherein light rays from the third illuminant are coupled at a first end of the third light conductor and decoupled at a second end of the third light conductor.

16. The multifunction lamp unit according to claim 1, further comprising a plurality of light decoupling regions provided by at least one of the clear lens and the housing.

17. The multifunction lamp unit according to claim 1, wherein the multifunction lamp unit is configured to provide a plurality of light decoupling directions or light decoupling ranges.

18. The multifunction lamp unit according to claim 1, further comprising a plurality of light decoupling regions, with light having different characteristics being decoupled from the different decoupling regions.

19. The multifunction lamp unit according to claim 1, wherein the clear lens is made out of a polymeric substrate, wherein the polymeric substrate is coated with a chromium-based reflective coating and wherein the polymeric substrate and the chromium-based reflective coating are at least in part permeable to light originating from at least one of the light foil and the at least one illuminant.

20. The multifunction lamp unit according to claim 19, wherein the coating is an alloy of chromium and a dopant material, the dopant material being selected from hexagonally close-packed transition metals, the alloy having a crystal structure of a primary body-centered cubic phase in coexistence with a secondary omega hexagonally close-packed phase.

21. The multifunction lamp unit according to claim 20, wherein the alloy is a binary alloy of chromium and the dopant material.

22. The multifunction lamp unit according to claim 20, wherein the alloy is a binary alloy and the dopant material is zirconium, and wherein the atomic percentage of the zirconium in the binary alloy ranges from about 4.5 at. % to about 5.8 at. %.

23. The multifunction lamp unit according to claim 20, wherein the alloy is a binary alloy and the dopant material is titanium, and wherein the atomic percentage of the titanium in the binary alloy ranges from about 1.9 at. % to about 5.8 at. %.

24. The multifunction lamp unit according to claim 20, wherein the alloy is a binary alloy and the dopant material is cobalt, and wherein the atomic percentage of the cobalt in the binary alloy ranges from about 1.9 at. % to 5.7 at. %.

25. The multifunction lamp unit according to claim 19, wherein the at least one illuminant comprises a first illuminant, a second illuminant, a third illuminant, and a fourth illuminant, and the polymeric substrate comprises a polymeric light pipe into which light from the fourth illuminant is coupled.

26. The multifunction lamp unit according to claim 19, wherein the atomic percentage of the dopant material in the binary alloy ranges from about 1.9 at. % to about 5.8 at. %.

27. The multifunction lamp unit according to claim 19, wherein the dopant material is selected from hexagonally close-packed transition metals zirconium, titanium, cobalt, hafnium, rubidium, yttrium and osmium.

28. The multifunction lamp unit according to claim 19, wherein the dopant material is selected from hexagonally close-packed transition metals zirconium, titanium and cobalt.

29. The multifunction lamp unit according to claim 19, wherein the coating has a thickness of 200 nm, 100 nm, from 40 nm to 80 nm, from 50 nm to 70 nm, or about 60 nm.

30. The multifunction lamp unit according to claim 19, wherein the polymeric substrate is formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal and blends of these.

31. The multifunction lamp unit according to claim 19, wherein the polymeric substrate is formed from a material selected from the group of polycarbonate, poly(2,2'-dihydroxyphenylpropane) carbonate, polydiethyleneglycol bis (allyl carbonate), polymethylmethacrylate and polystyrene, or blends thereof.

32. The multifunction lamp unit according to claim 19, wherein the polymeric substrate includes a pre-coated film in the form of either a hardcoat, an inorganic oxide, or a thin metal film, or a combination of such pre-coated films.

33. A rear view device of a vehicle comprising a multifunction lamp unit as recited in claim 1.

34. The rear view device of claim 33, wherein the at least one illuminant and the light foil are configured to perform different light functions.

35. The rear view device of claim 34, wherein the at least one illuminant comprises at least two illuminants which are configured to perform different light functions.

36. The rear view device of claim 33, further comprising a head moveable relative to the vehicle, with the head comprising at least one casing part providing at least one opening for the multifunction lamp unit.

37. The rear view device of claim 36, wherein the clear lens extends along the casing part.

38. The rear view device of claim 36, wherein the clear lens is connected to at least the casing part.

39. The rear view device of claim 36, wherein the casing part is provided by a bezel.

40. The rear view device of claim 33, further comprising at least one of a camera and a reflective element.

41. The rear view device of claim 33, further comprising a camera, the camera being arranged within the head.

42. The rear view device of claim 33, further comprising at least one light decoupling region providing at least one of a turn light indicator, a blind spot indicator, a puddle light, a logo light and an approach light.

* * * * *